United States Patent [19]
Umeda

[11] Patent Number: 5,805,265
[45] Date of Patent: Sep. 8, 1998

[54] PROGRESSIVE LENS

[75] Inventor: Toshiaki Umeda, Tokyo, Japan

[73] Assignee: Nikon Corporation, Tokyo, Japan

[21] Appl. No.: 667,044

[22] Filed: Jun. 21, 1996

[30] Foreign Application Priority Data

Aug. 8, 1995 [JP] Japan .................................. 7-222680

[51] Int. Cl.⁶ ...................................................... G02C 7/06
[52] U.S. Cl. .......................................................... 351/169
[58] Field of Search ..................................... 351/168, 169, 351/170, 171, 172

[56] References Cited

U.S. PATENT DOCUMENTS

| | | | |
|---|---|---|---|
| 4,537,479 | 8/1985 | Shinohara et al. | 351/169 |
| 4,762,408 | 8/1988 | Shinohara | 351/169 |
| 5,123,725 | 6/1992 | Winthorp | 351/169 |
| 5,137,343 | 8/1992 | Kelch et al. | 351/169 |

FOREIGN PATENT DOCUMENTS 2-248920  10/1990  Japan .
6-90368   11/1994  Japan .

*Primary Examiner*—Scott J. Sugarman
*Attorney, Agent, or Firm*—Shapiro and Shapiro

[57] ABSTRACT

A progressive lens including, along a principal meridional line dividing a refracting surface of the lens into a nasal side area and a temporal side area, a far viewing portion having a surface refracting power corresponding to a far view, a near viewing portion having a surface refracting power corresponding to a close-range view, and an intermediate viewing portion continuously connecting the refracting powers of the two portions together between the far viewing portion and the near viewing portion, a distance along the principal meridional line between a far viewing center of the far viewing portion and a near viewing center of the near viewing portion being within 18 mm, a width of a clear vision area in the near viewing portion being greater than or equal to a width of a clear vision area in the far viewing portion.

5 Claims, 8 Drawing Sheets

PROGRESSIVE LENS

BACKGROUND OF THE INVENTION

1. Field of the Invention

This invention relates to a progressive lens for use to aid ocular accommodation ability.

2. Related Background Art

As ophthalmic lenses to aid ocular accommodation ability when the ocular accommodation ability has declined and near view has become difficult, there are known various progressive lenses provided with a portion located above during wear for far vision having a refracting power corresponding to a far view (hereinafter referred to as the "far viewing portion"), a portion below for near vision having a refracting power corresponding to a near view (hereinafter referred to as the "near viewing portion") and a progressive zone of which the refracting power continuously varies between the both portions (hereinafter referred to as the "intermediate viewing portion").

Herein, the distance between the far viewing center and the near viewing center is called the length of the intermediate progressive portion (hereinafter referred to as the "length of the progressive zone"), and the amount of increase in refracting power added between the far viewing center and the near viewing center is called the addition. Also, herein, the terms "above", "below", "horizontal" and "vertical" indicate positional relations in the lens during its wear.

When in a progressive lens, the clear vision areas of the far viewing portion and the near viewing portion are secured widely and they are linked together by a progressive area (progressive zone), lens aberrations concentrate in the area lateral of the progressive zone. As a result, particularly in the area lateral of the progressive zone, bad imaging (blur of image) and distortion of image occurs, and when the line of sight is rotated or moved in such an area, the distortion of image is perceived as the sway of image by the wearer and thus, the wearer has an unpleasant feeling of wear.

To solve such a problem of visual characteristic, design and evaluation based on various points of view have been done in conventional progressive lenses.

FIG. 1 of the accompanying drawings shows the epitome of the area division of a progressive lens designed symmetrically. The progressive lens shown is provided with a far viewing portion F located above during wear, a near viewing portion N below and an intermediate viewing portion P of which the refracting power continuously varies between the areas N and P. Regarding the shapes of the lens surfaces, the line of intersection MM' between a cross-section along a meridional line obliquely running from above to below substantially in the middle of the lens surfaces in the state of wear and the object side lens surface is used as a fiducial line for representing the specification such as the addition of the lens, and is used as an important fiducial line in the design of the lens as well. In the thus symmetrically designed progressive lens, the far viewing center OF of the far viewing portion F, the far viewing eye point E, the geometrical center OG of the lens surface and the near viewing center (i.e., the near viewing eye point) ON lie on the center line MM' which is fiducial.

Also, as shown in FIG. 2 of the accompanying drawings, there has been proposed a progressive lens in which the near viewing portion N and the intermediate viewing portion P are asymmetrically disposed with it taken into account that in the worn state of the lens, the near viewing portion N comes near the nasal side (hereinafter referred to as the "asymmetrical type progressive lens").

Again in such an asymmetrical type progressive lens, the center line MM' comprising the line of intersection between a cross-section passing through the far viewing center OF of the far viewing portion F, the far viewing eye point E, the geometrical center OG of the lens surface and the near viewing center ON and the object side lens surface is used as a fiducial line. In the present invention, these fiducial lines are generically referred to as the "principal meridional line".

In the thus symmetrically designed progressive lens (hereinafter referred to as the "symmetrical type progressive lens"), the principal meridional line MM' symmetrically divides the refracting surface of the lens into a nasal side area and a temporal side area, but in the asymmetrical type progressive lens, the principal meridional line MM' is displaced toward the nasal side in the intermediate viewing portion P and the near viewing portion N.

FIG. 3 of the accompanying drawings shows the distribution of typical astigmatic difference in a conventional symmetrical type progressive lens. In FIG. 3, there is shown a curve linking points equal in astigmatic difference together, i.e., an equi-astigmatic line.

Generally, it is said that the value of astigmatic difference at which an object can be seen without the blur of image being felt is 0.5 diopter (0.5 D) or less. The smallest equi-astigmatic line in FIG. 3 is the curve of 0.5 diopter. Accordingly, on the side more adjacent to the principal meridional line MM' than this equi-astigmatic line of 0.5 diopter, an object can be seen without the blur of image being felt.

The area in which an object can thus be seen without the blur of image being felt is referred to as the "clear vision area". The horizontal width of this clear vision area becomes an important factor in evaluating the performance of the progressive lens.

Generally, the performance of the progressive lens is evaluated in the far viewing portion F by the maximum width of the clear vision area above the far viewing center OF, in the near viewing portion N by the maximum width of the clear vision area below the near viewing center ON, and in the intermediate viewing portion P by the minimum width of the clear vision area between the far viewing center OF and the near viewing center ON.

The performance of the progressive lens resides at the following points:

(1) That the widths of the clear vision areas in the far viewing portion F and the near viewing portion N are sufficiently great in practical use.

(2) That the width of the clear vision area in the intermediate viewing portion P is sufficient in practical use and the length of the progressive zone is suitable.

(3) The aberration of the refracting surface is as small as possible.

The progressive lens, however, has in one refracting surface the far viewing portion and the near viewing portion each having a substantially constant refracting power, and the intermediate viewing portion including the progressive zone in which the refracting power continuously varies. Therefore, a relatively great lens aberration exists in the lateral area of the intermediate viewing portion. The lens aberration in this lateral area of the intermediate viewing portion is an inconvenience which cannot be avoided in principle in the progressive lens. Accordingly, to obtain a more comfortable feeling of wear, design by type adjusted to a wearer's condition of use should be made. So, there are known various progressive lenses adjusted to wearers' conditions of use.

FIG. 4 of the accompanying drawings shows a typical equi-astigmatic difference line in a progressive lens for general life of the conventional far viewing and near viewing priority type.

In the progressive lens of the conventional far viewing and near viewing priority type, the length of the progressive zone is usually 12 to 15 mm. In the design of this type, the width of the clear vision area of the far viewing portion is kept great and yet the angle of rotating of the eyeball is made small (the length of the progressive zone is made short) and the amount of movement of the line of sight during near view is made small. Further, the width of the clear vision area of the near viewing portion is made great to the utmost to thereby pursue the amenity in far viewing and near viewing.

A disadvantage peculiar to the progressive lens of the conventional far viewing and near viewing priority type is that the width of the clear vision area of the intermediate viewing portion is relatively small and the lens aberration of the lateral area of the progressive zone is great and therefore the sway of image when the line of sight is rotated is great. Accordingly, the progressive lens of the conventional far viewing and near viewing priority type is suitable for such a condition of use that the line of sight is substantially not rotated, for example, reading or the like.

FIG. 5 of the accompanying drawings shows a typical equi-astigmatic difference line in a progressive lens for general life of the conventional far viewing and intermediate viewing priority type.

In the progressive lens of the conventional far viewing and intermediate viewing priority type, the length of the progressive zone is usually 18 mm or greater. In the design of this type, the width of the clear vision area of the far viewing portion is greatest, and the length of the progressive zone is made great and the width of the clear vision area of the intermediate viewing portion is made relatively great.

A disadvantage peculiar to the progressive lens of the conventional far viewing and intermediate viewing priority type is that the length of the progressive zone is great and the width of the clear vision area in the near viewing portion is small and this is unsuitable for near viewing work. Accordingly, the progressive lens of the conventional far viewing and intermediate viewing priority type is suitable for a condition of use under which far view and intermediate view are chief, for example, sports or the like.

FIG. 6 of the accompanying drawings shows a typical equi-astigmatic difference line in a progressive lens for general life of the conventional balance type.

In the progressive lens of the conventional balance type, the length of the progressive zone is usually 15 to 18 mm. As is apparent from the length of the progressive zone, the progressive lens of the balance type is a progressive lens having the intermediate performance of the far viewing and near viewing priority type and the far viewing and intermediate viewing priority type, and is the representative type of the progressive lenses being developed. The progressive lens of the balance type is suitable for spectacles continuously worn for a long time, i.e., so-called left-on spectacles.

Thus, a wearer can choose a suitable type in conformity with the condition of use from among the progressive lenses of the far viewing and near viewing priority type, the far viewing and intermediate viewing priority type and the balance type.

The progressive lenses of the above-described three types are common in that they have the performance for obtaining a comfortable feeling of wear when the wearer thereof naturally views the distance (views the front). This is because far view is indispensable in usual life.

As previously described, the progressive lens has in one refracting surface the far viewing portion and the near viewing portion each having a substantially constant refracting power, and the intermediate viewing portion including the progressive zone of which the refracting power continuously varies. Accordingly, when a wide clear vision area is disposed in the far viewing portion with importance attached to the comfortable feeling of wear in far view, one or both of the width of the clear vision area in the intermediate viewing portion and the width of the clear vision area of the near viewing portion are sacrificed and the aberration of the refracting surface is made as small as possible. This is not exceptional even in the progressive lens of the balance type.

The progressive lenses of the above-described three types are generically referred to as the "progressive lens for general life".

As previously described, the progressive lens should be designed in conformity with the wearer's use. From this point of view, when the wearer's use is chiefly for the near viewing work, there becomes necessary a progressive lens of a type in which, unlike the conventional progressive lenses, the width of the clear vision area in the near viewing portion is greater than or equal to the width of the clear vision area in the far viewing portion, i.e., the intermediate viewing and near viewing priority type.

As such progressive lenses of the intermediate viewing and near viewing priority type, there are known, for example, the progressive lenses disclosed in Japanese Patent Application Laid-Open No. 2-248920 and Japanese Patent Publication No. 6-90368.

However, in the progressive lenses of the conventional intermediate viewing and near viewing priority type, a tentative improvement in visual performance has been contrived for the condition of use chiefly for the near viewing work, but it has still been insufficient to obtain optimum visual performance.

That is, in the progressive lens of the intermediate viewing and near viewing priority type disclosed in Japanese Patent Application Laid-Open No. 2-248920, the "range" of the long distance field of view and the "range" of the short distance field of view are actually not ranges, but are two mathematical points. Over a range larger than usual, i.e., the entire range of the lens, astigmatism is distributed to thereby decrease the value of undesirable surface astigmatism. However, an optically stable range (the width of the clear vision area) in the long distance field of view and the short distance field of view has not been widely secured.

Also, in the progressive lens of the intermediate viewing and near viewing priority type disclosed in Japanese Patent Publication No. 6-90368, the gradient of the refracting power on the central fiducial line (principal meridional line) is made small. Therefore, the position of the far viewing eye point is considerably above and the position of the near viewing eye point is substantially similar to that in the conventional progressive lens for general life. As a result, under the condition of use chiefly for the near viewing work, there has been the inconvenience that fatigue is caused by the rotating of the eyeballs.

SUMMARY OF THE INVENTION

The present invention has been made in view of the above-noted problems and has as its object to provide a progressive lens for the near viewing work in which a practically sufficiently wide clear vision area is disposed in the near viewing portion and yet the width of a clear vision area equivalent to that in a progressive lens for general life is secured in the intermediate viewing portion and which has a far viewing portion sufficiently fit for use.

To solve the above-noted problems, according to the present invention, there is provided a progressive lens provided with a far viewing portion having a surface refracting power corresponding to a far view along a principal meridional line dividing the refracting surface of the lens into a nasal side area and a temporal side area, a near viewing portion having a surface refracting power corresponding to a close-range view, and an intermediate viewing portion continuously connecting the refracting powers of the two portions together between the far viewing portion and the near viewing portion, characterized in that the distance along the principal meridional line between the far viewing center of the far viewing portion and the near viewing center of the near viewing portion is within 18 mm, and the width of the clear vision area in the near viewing portion is greater than or equal to the width of the clear vision area in the far viewing portion.

Also, in a preferred embodiment of the present invention, the maximum width of the clear vision area in the far viewing portion is at least double the minimum width of the clear vision area in the intermediate viewing portion. Further, it is preferable that the value of the maximum astigmatic difference in the refracting surface of the lens be smaller than the addition added to between the far viewing center of the far viewing portion and the near viewing center of the near viewing portion.

The progressive lens of the present invention has a refracting power as a surface around the far viewing eye point and around the near viewing eye point. Therefore, the width of the clear vision area can be made great in the far viewing portion and in the near viewing portion.

Also, since the length of the progressive zone is within 18 mm, the angle of rotating of the eyeball becomes small and the feeling of fatigue is little.

Further, the width of the clear vision area in the near viewing portion is made greater than or equal to the width of the clear vision area in the far viewing portion. Therefore, in comparison to the conventional progressive lens for general life, the width of the clear vision area in the near viewing portion can be made great.

Thus, according to the present invention, there can be achieved a progressive lens for the near viewing work (the intermediate viewing and near viewing priority type) in which a very wide clear vision area is secured as the visual performance of the near viewing portion and yet the angle of rotating of the eyeball is small and fatigue is little.

DESCRIPTION OF THE PREFERRED EMBODIMENT

An embodiment of the present invention will hereinafter be described with reference to the accompanying drawings.

Performance evaluation has been made with respect to a progressive lens having a refracting surface shape according to an embodiment of the present invention.

Figure 1:
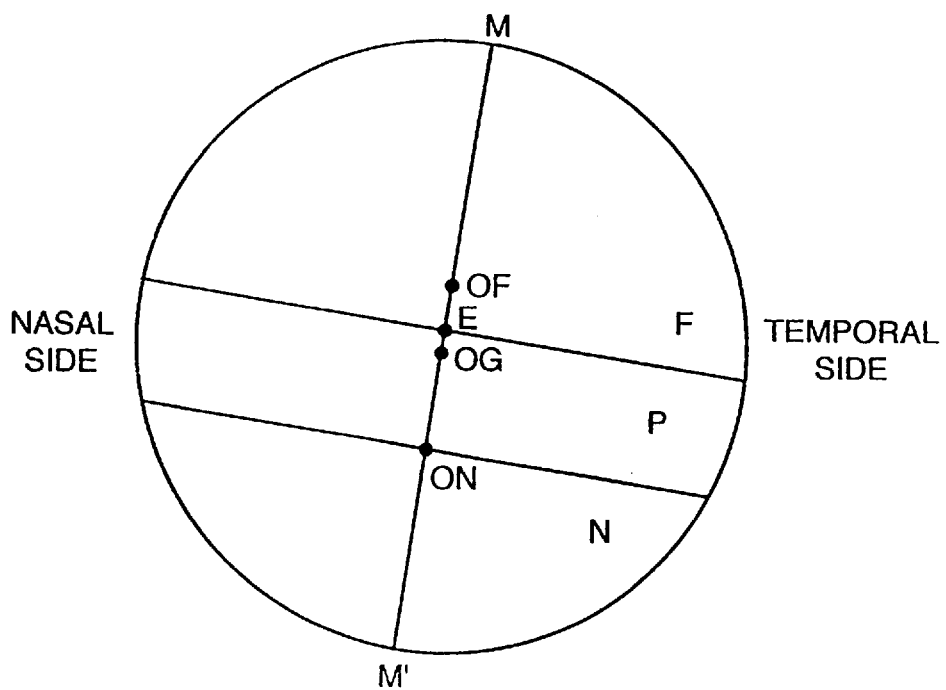
FIG. 1 shows the epitome of the area division of a symmetrical type progressive lens.
Figure 2:
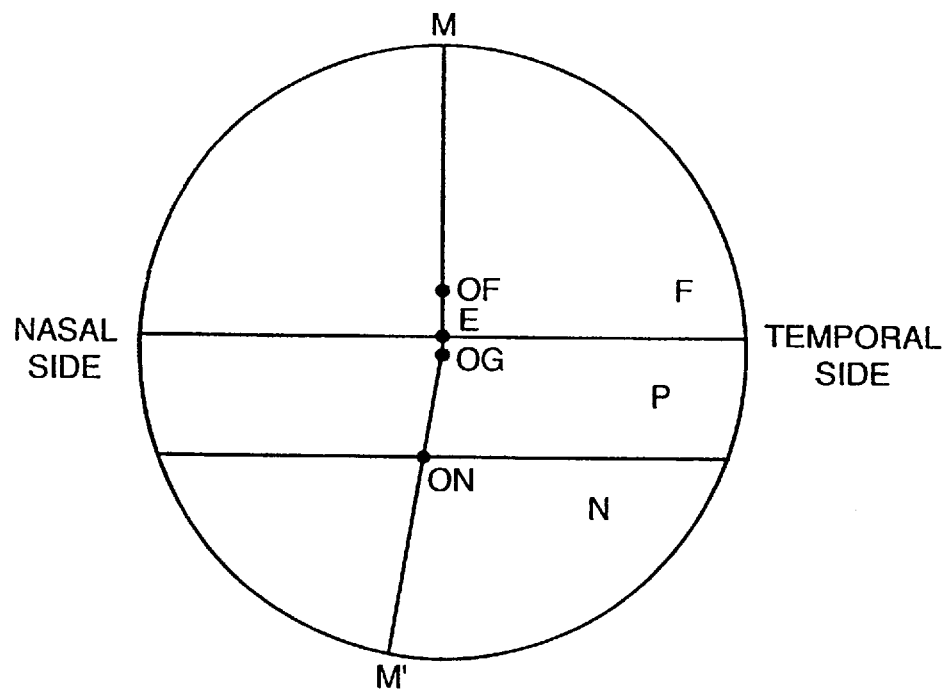
FIG. 2 shows the epitome of the area division of an asymmetrical type progressive lens.
Figure 3:
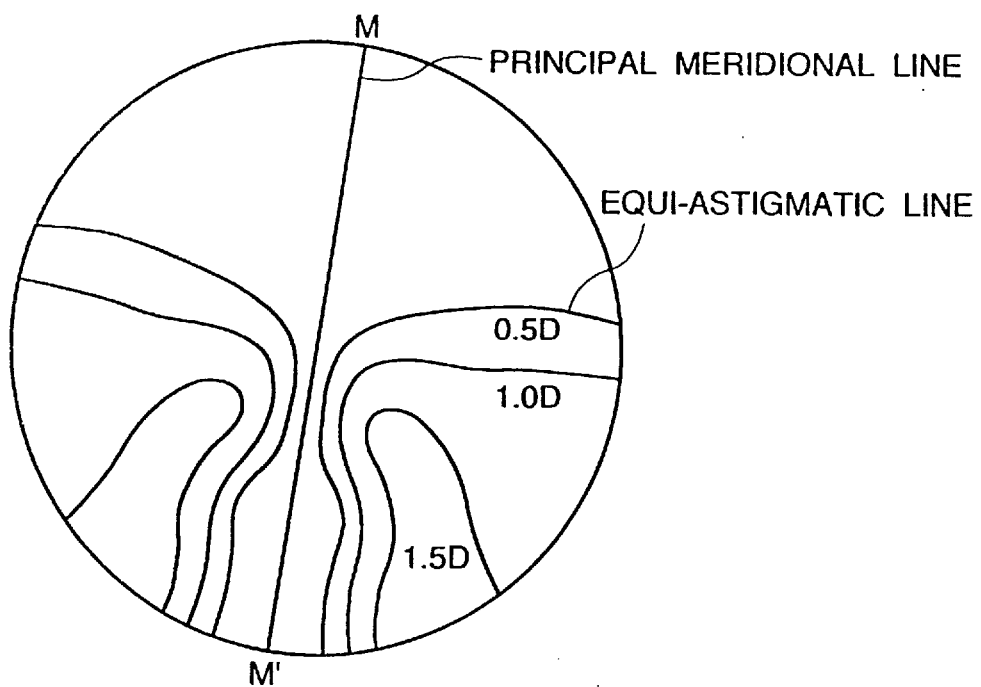
FIG. 3 shows the typical distribution of astigmatic difference in a conventional symmetrical type progressive lens.
Figure 4:
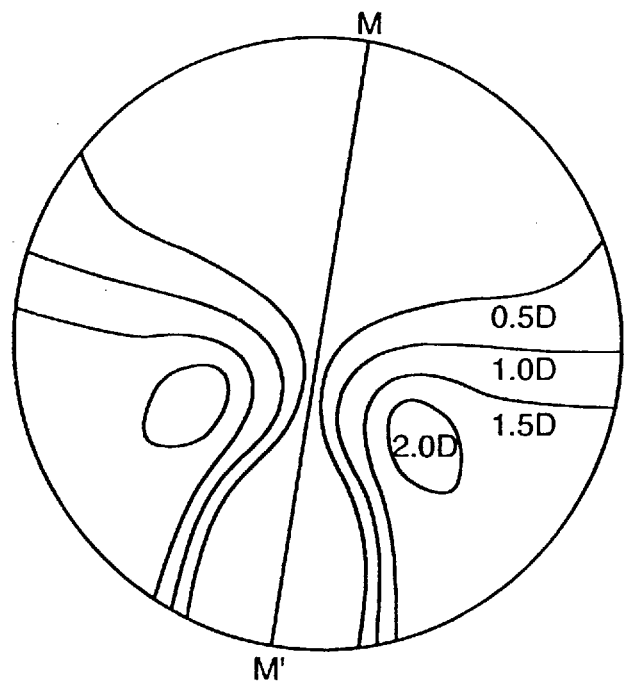
FIG. 4 shows a typical equi-astigmatic line in a progressive lens for general life of the conventional far viewing and near viewing priority type.
Figure 5:
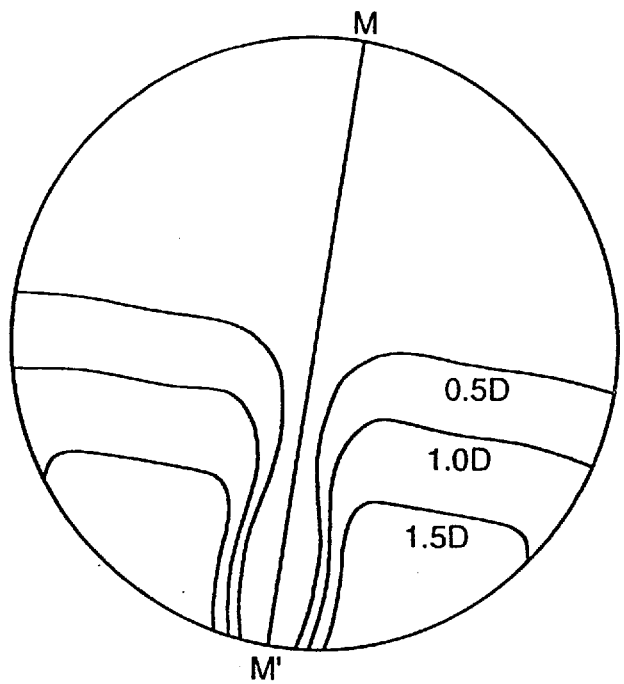
FIG. 5 shows a typical equi-astigmatic line in a progressive lens for general life of the conventional far viewing and intermediate viewing priority type.
Figure 6:
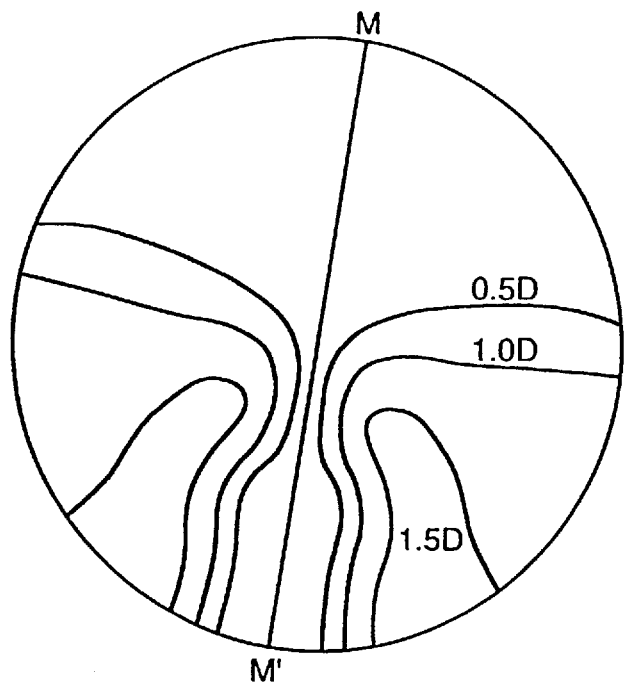
FIG. 6 shows a typical equi-astigmatic line in a progressive lens for general life of the conventional balance type.
Figure 7:
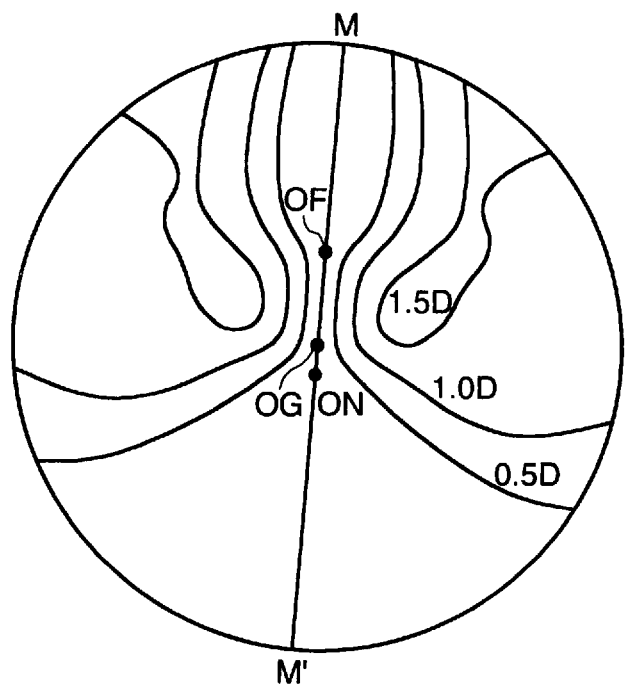
FIG. 7 shows a typical equi-astigmatic line in a progressive lens according to an embodiment of the present invention.

FIG. 7 shows the equi-astigmatic lines of the progressive lens according to the embodiment of the present invention. In FIG. 7, the equi-astigmatic line is shown at each 0.5 diopter (0.5 D). Also, as previously described MM' designates the principal meridional line, OG denotes the geometrical center, OF designates the far viewing center and ON denotes the near viewing center. In the progressive lens of the intermediate viewing and near viewing priority type according to the present embodiment, the base curve of a far viewing portion F is 3.50 diopters and the addition is 2.00 diopters.

As is apparent from FIG. 7, the width of the clear vision area in the near viewing portion is greater than the width of the clear vision area in the far viewing portion. Also, the value of the maximum astigmatic difference is 1.50 diopter and is 75% of the addition (equivalent to that in the balance type of the progressive lens for general life). Further, the width of the clear vision area in the intermediate viewing portion is about 5 mm.

Figure 8:
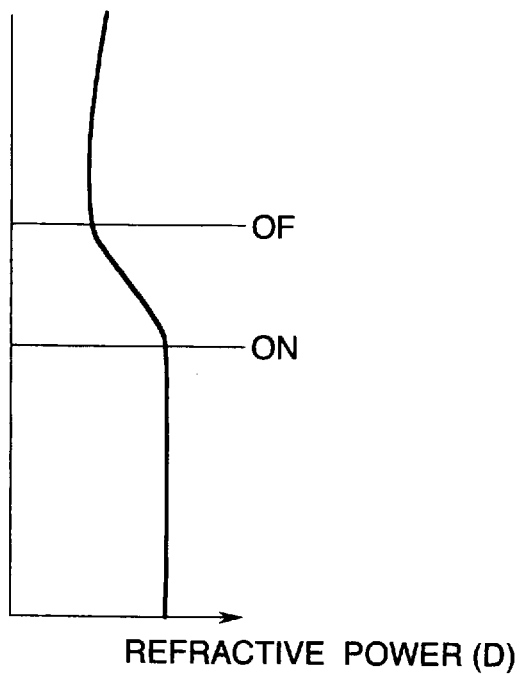
FIG. 8 is a graph showing a variation in refractive power on the principal meridional line MM' of FIG. 7.

FIG. 8 shows a variation in the refractive power on the principal meridional line MM' of FIG. 7.

The far viewing center OF is located 12 mm above the geometrical center OG of the lens, and the near viewing center ON is located 4 mm below the geometrical center OG. That is, the length of the progressive zone which is the distance along the principal meridional line MM' between the far viewing center OF and the near viewing center ON is 16 mm.

Also, the additional refractive power at the geometrical center OG is 75% of the addition, i.e., 1.50 diopter. Generally, the intermediate view distance is about 50 cm (2 diopters) to about 2 m (0.5 diopter). So, a position having an additional refractive power of 1.50 diopter which is the central value is made coincident with the position of the geometrical center OG.

A progressive lens for near viewing work is a progressive lens for realizing a comfortable feeling of wear in the near viewing portion while sacrificing the width of the clear vision area in the far viewing portion to some extent, and the smaller is the amount of movement of the line of sight to the near viewing center, the easier the far view. In the present embodiment, the near viewing center is reached simply by moving the line of sight from the geometrical center of the lens to only 4 mm below. Incidentally, in the progressive lens of the conventional intermediate viewing and near viewing priority type, the near viewing center has been at a position substantially equal to that in the progressive lens for general life, i.e., about 14 to 16 mm below the geometrical center OG.

Also, in the progressive lens, the smaller is the value of the maximum astigmatic difference laterally of the intermediate viewing portion, the greater can be made the width of the clear vision area. In the present embodiment, the value of the maximum astigmatic difference laterally of the intermediate viewing portion is about 75% of the addition. Further, an area having the maximum astigmatic difference is located above a horizontal line passing through the geometrical center OG and therefore does not hinder the near viewing work.

Further, the position of the far viewing center OF of the far viewing portion is restricted to a position equivalent to that in the progressive lens of the conventional intermediate viewing and near viewing priority type. Accordingly, if a wearer draws in his chin and turns up his eyes, the progressive lens of the intermediate viewing and near viewing priority type will also be sufficiently usable for far view.

In the present embodiment, the present invention is described with a type, among the progressive lenses of the intermediate viewing and near viewing priority type, in which the angle of rotating of the eyeball during near view is small and the width of the clear vision area in the near viewing portion is great and stable taken as an example. However, it is apparent that the present invention can also be applied to a progressive lens of a type in which the magnitude of the angle of rotating of the eyeball during near view has been changed or a type in which the width of the clear vision area in the near viewing portion and the width of the clear vision area in the far viewing portion are substantially equal to each other.

Further, it is apparent that the present invention can also be applied to an asymmetrical type progressive lens.

As described above, according to the present invention, there can be realized a progressive lens for near viewing work in which a practically sufficiently wide clear vision area is disposed in the near viewing portion and yet the width of a clear vision area equivalent to that in a progressive lens for general life is secured in the intermediate viewing portion and which has a far viewing portion sufficiently fit for use.

What is claimed is:

1. A progressive lens including, along a principal meridional line dividing a refracting surface of the lens into a nasal side area and a temporal side area, a far viewing portion having a surface refracting power corresponding to a distant view, a near viewing portion having a surface refracting power corresponding to a close-range view, and an intermediate viewing portion continuously connecting the refracting powers of the near and far portions together between said far viewing portion and said near viewing portion, a distance along said principal meridional line between a far viewing center of said far viewing portion and a near viewing center of said near viewing portion being within 18 mm, a width of a clear vision area in said near viewing portion being greater than or equal to a width of a clear vision area in said far viewing portion.

2. A progressive lens according to claim 1, wherein a maximum width of the clear vision area in said far viewing portion is at least double a minimum width of a clear vision area in said intermediate viewing portion.

3. A progressive lens according to claim 1, wherein a value of a maximum astigmatic difference in the refracting surface of said lens is smaller than an addition between the far viewing center of said far viewing portion and the near viewing center of said near viewing portion.

4. A progressive lens according to claim 1, wherein said far viewing center is above said near viewing center and a maximum astigmatic difference is located above a horizontal line passing through the geometric center of the lens.

5. A progressive lens according to claim 1, wherein a distance from said near viewing center to a geometric center of the lens is smaller than a distance from said far viewing center to said geometric center.

* * * * *